United States Patent [19]

Ramesh

[11] Patent Number: 5,600,676
[45] Date of Patent: Feb. 4, 1997

[54] MODULATION SCHEME WITH LOW ENVELOPE VARIATION FOR MOBILE RADIO BY CONSTRAINING A MAXIMUM MODULUS OF A DIFFERENTIAL PHASE ANGLE

[75] Inventor: Rajaram Ramesh, Schenectady, N.Y.

[73] Assignee: Ericsson GE Mobile Communications Inc., Research Triangle Park, N.C.

[21] Appl. No.: 86,797

[22] Filed: Jul. 6, 1993

[51] Int. Cl.$^6$ ................................................. H04L 27/10
[52] U.S. Cl. ......................... 375/283; 375/308; 375/330; 332/103; 332/144
[58] Field of Search ................................... 332/103, 144; 375/279, 280, 281, 283, 308, 330, 295, 265, 284, 285, 296, 269, 312, 298, 302

[56] References Cited

U.S. PATENT DOCUMENTS

| | | | |
|---|---|---|---|
| 4,323,731 | 4/1982 | Hershberger | 381/16 |
| 4,817,116 | 3/1989 | Akaiwa . | |
| 5,311,552 | 5/1994 | Chennakesher et al. | 375/265 |
| 5,311,553 | 5/1994 | Chennakesher et al. | 375/265 |
| 5,394,440 | 2/1995 | Goldstein et al. | 375/265 |
| 5,418,798 | 5/1995 | Nei | 371/43 |

OTHER PUBLICATIONS

IEEE Transactions On Broadcasting, vol. 37, No. 1, Mar. 91, NY, pp. 1–8, "Pi/4–QPSK Modex For Satellite Sound/Data Broadcast Systems", Liu et al.

IEEE Transactions On Broadcasting, vol. 37, No. 1, Mar. 1991, New York, pp. 1–8, "PI/4–QPSK Modems For Satellite Sound/Data Broadcast Systems", Liu et al.

U.S. Patent Application "A Trellis Coded Modulation Scheme with Low Envelope Variation for Mobile Radio" by Rajaram Ramesh (Docket No. RD–22,411) filed concurrently with this application.

U.S. Patent Application "Trellis Coding Technique to Improve ACIPR in Land Mobile Radio Systems Under Peak Power Constraints" by Sandeep Chennakeshu, Amer A. Hassan and John B. Anderson Serial No. 07/898,670, filed Jun. 15, 1992 (Attorney Docket No. RD–21,622).

U.S. Patent Application "Improved Trellis Coding Technique to Increase Adjacent Channel Interference Protection Ratio in Land Mobile Radio Systems Under Peak Power Constraints" by Sandeep Chennakeshu, Rajaram Ramesh, Amer A. Hassan, John B. Anderson, Ser. NO. 07/975,201, filed Jun. 12, 1992 (Attorney Docket No. RD–22,127).

"Highly Efficient Digital Mobile communications with a Linear Modulation Method" by Y. Akaiwa and Y. Nagata, IEEE Journal of Sel. Areas in Commun., vol. SAC–5, pp. 890–895, Jun. 1987.

"Introduction to Trellis–coded Modulation with Applications", Biglieri, et alpp 399–401, ch. 9, Analysis and Performance of TCM for Fading Channels.

"Computer Programs: Design Technique", Appendix C. pp. 527–539.

Primary Examiner—Wellington Chin
Assistant Examiner—William Luther
Attorney, Agent, or Firm—Nixon & Vanderhye P.C.

[57] ABSTRACT

A digital radio communication system achieves low envelope variations in a transmitted signal by encoding digital information as phase angle differences in a transmitted radio signal and by constraining the maximum possible phase angle difference. This reduction in envelope variation relaxes the linearity requirements for a desired level of distortion suppression of a radio frequency (RF) amplifier means employed for transmitting the radio signal. In addition, lower envelope variations imply a higher average transmit power for a given maximum transmitted power, thereby extending range and battery life.

8 Claims, 8 Drawing Sheets

π/4-shift DQPSK present invention with Θ=π/2

Fig. 1

(Prior Art)

Fig. 2

Fig. 3 present invention with Θ=π/2

*Fig. 4b*

π/4-shift DQPSK

MODULATION SCHEME WITH LOW ENVELOPE VARIATION FOR MOBILE RADIO BY CONSTRAINING A MAXIMUM MODULUS OF A DIFFERENTIAL PHASE ANGLE

CROSS REFERENCES TO RELATED APPLICATIONS

This application is related to U.S. Patent applications "A Trellis Coded Modulation Scheme with Low Envelope Variation for Mobile Radio" by Rajaram Ramesh (Docket No. RD-22,411) filed concurrently with this application; "Trellis Coding Technique to Improve ACIPR in Land Mobile Radio Systems Under Peak Power Constraints" by Sandeep Chennakeshu, Amer A. Hassan and John B. Anderson Serial No. 07/898,670, filed Jun. 15, 1992; and "Improved Trellis Coding Technique to Increase Adjacent Channel Interference Protection Ratio in Land Mobile Radio Systems Under Peak Power Constraints" by Sandeep Chennakeshu, Rajaram Ramesh, Amer A. Hassan, John B. Anderson, Ser. No. 07/975,201, filed Jun. 12, 1992; all assigned to the present assignee and hereby incorporated by reference.

BACKGROUND OF THE INVENTION

1. Field of the Invention

This invention relates to land mobile radio systems and more specifically to a method and apparatus for minimizing adjacent channel interference by constraining transmitted power envelope variations for mobile radio systems.

2. Description of Related Art

Conventional land mobile radio (LMR) channels employ narrow-band frequency division multiplexed (FDMA) systems for base stations to communicate with mobile radio units. Each base unit/mobile unit communicating pair employs a different frequency band.

Speech communication may be executed by digitizing the speech, and transmitting the encoded speech information. Other digital information may be desired to be communicated between a base and mobile radio unit.

Currently, there is an immediate need for an increase in capacity of LMR systems in the U.S. for such applications as public safety trunking. The trend is to increase capacity by splitting each existing 25 KHz channel used in LMR systems into two 12.5 KHz channels. However, this causes adjacent channel interference (ACI). ACI is interference introduced at a receiver from a transmitter broadcasting at a frequency corresponding to an adjacent channel and this is sometimes called adjacent channel 'splatter'. This interference is increased by intermodulation and harmonic distortions caused by non-linearities in a radio frequency (RF) amplifier in the transmitter.

The need for capacity in land mobile radio (LMR) systems can be met by improving spectral efficiency (to values greater than 1 bit/sec/Hz). However, the achievable spectral efficiency is limited by stringent adjacent-channel interference protection specifications.

Continuous phase modulation (CPM) schemes such as 4-level digital FM can meet the adjacent channel interference protection ratio (ACIPR) requirements and also exhibit acceptable distortions from a non-linear RF amplifier. However, these schemes offer inadequate spectral efficiency (0.75 bits/sec/Hz) to meet future increases in capacity.

Linear modulation, such as $\pi/4$-shifted differential quadrature phase shift keying (DQPSK), offers higher spectral efficiency than constant envelope CPM schemes but requires highly linear RF amplifiers to suppress ACI. The requirement of a linear RF amplifier arises due to high envelope variations exhibited by $\pi/4$-shifted DQPSK. Filtered $\pi/4$-shifted DQPSK offers an ACIPR of approximately 40–45 dB with a linearized conventional class-AB power amplifier as described in "Highly Efficient Digital Mobile communications with a Linear Modulation Method" by Y. Akaiwa and Y. Nagata, IEEE Journal of Sel. Areas in Commun., vol SAC-5 no. 5, pp. 890, June 1987 and U.S. patent application, "Improved Trellis Coding Technique to Increase Adjacent Channel Interference Protection Ratio in Land Mobile Radio Under Peak Under Peak Power Constraints", by S. Chennakeshu, et al, Ser. No. 07/975,201 filed Jun. 15, 1992.

The above comparison of constant envelope and linear modulation schemes is based on power and bandwidth occupancy. However, it is also important to address decoding complexity for the two schemes. While linear modulation schemes require amplifier linearization, these schemes are easier to synchronize and equalize for intersymbol interference (ISI) relative to continuous phase modulation schemes.

Currently there is a need for a digital mobile radio system exhibiting a linear modulation scheme which meets the stringent specifications on ACIPR with relaxed linearity requirements on the RF amplifier.

OBJECTS OF THE INVENTION

An object of the invention is to provide a linear modulation scheme which reduces linearity requirements of the transmitter amplifier.

Another object of the invention is to provide a method of communication having minimal envelope variation and an increased adjacent channel interference protection ratio (ACIPR) relative to conventional techniques.

SUMMARY OF THE INVENTION

A digital radio communications system for communicating digital information on adjacent frequency bands with low interference between adjacent channels comprises a transmitter having a mapper and radiofrequency (RF) amplifier. The mapper maps encoded digital information onto a signal constellation which is constrained such that the phase differences between subsequent transmitted symbols do not vary more than a specified maximum phase, thereby constraining the transmitted power envelope variations in the transmitted signal. The encoded signal is passed to the RF amplifier which amplifies the signal and transmits it to a receiver. The transmitted signal is then decoded according to the constrained signal constellation at the receiver.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
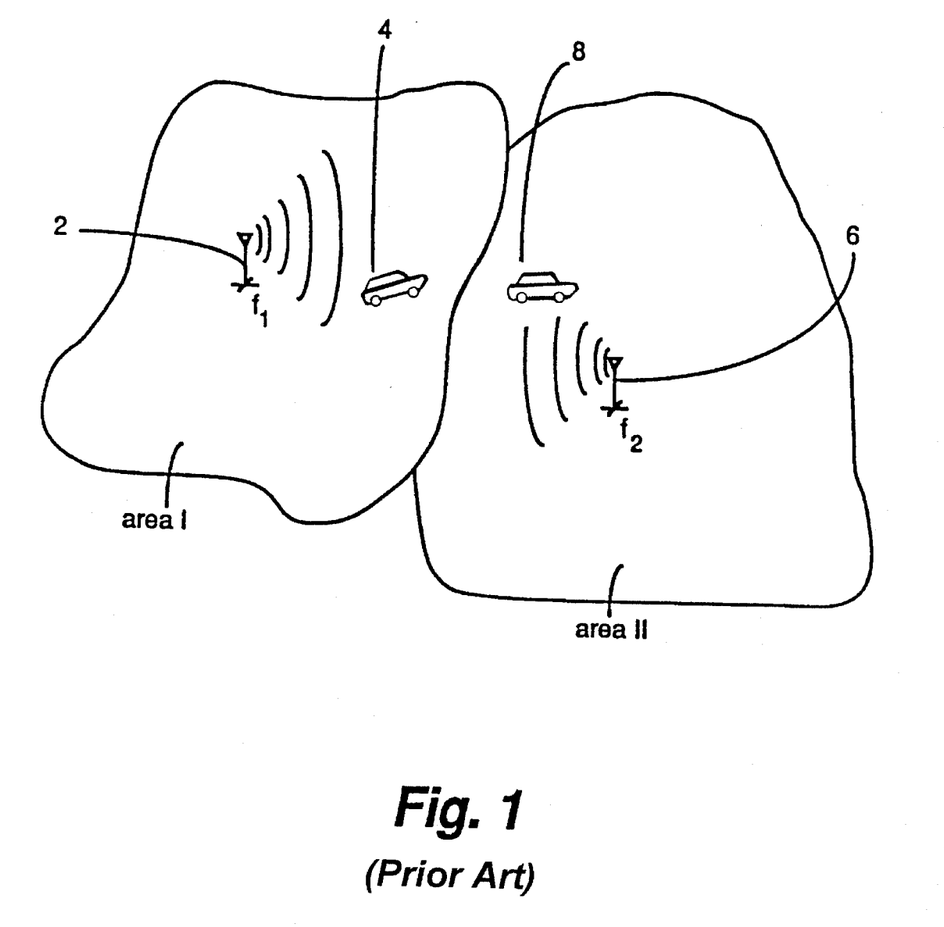
FIG. 1 is an illustration of two digital radio systems communicating in geographically adjacent areas using adjacent frequency bands.
Figure 2:
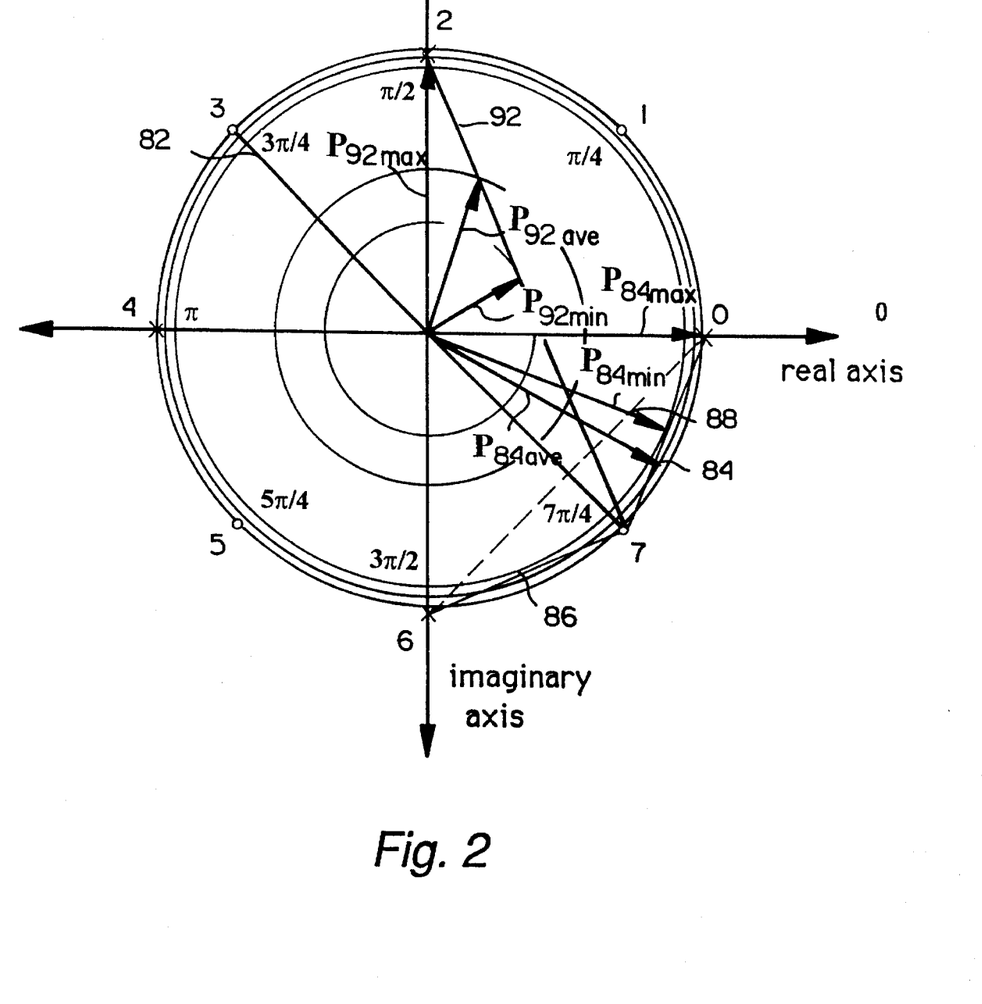
FIG. 2 is an illustration of an eight symbol signal constellation with theoretical symbol transitions superimposed upon it.

Typically, in land mobile radio (LMR) systems, contiguous geographic areas permit use of spectrally adjacent channels. In FIG. 1, area I and area II are geographically adjacent regions. An LMR base unit 2 communicates with mobile unit 4 at a frequency $f_1$. Similarly, an LMR base unit 6 communicates with a mobile unit 8 at a frequency $f_2$. Digital information to be transmitted, such as digitized speech, is encoded in symbols which are selected from a "constellation", such as the signal constellation shown in FIG. 2. The constellation has eight signal states indicated by symbols 0 through 7. Each symbol is represented by a phase angle and magnitude (being the distance from the center of the constellation) associated with it. If the last symbol sent by a transmitter was symbol 7, the phase angle is currently at $7/4\pi$ radians. If the next symbol to be sent is symbol 3, the phase angle must change by π radians in the mount of time allocated for the next symbol ($T_s$). Since the period allocated for each transition from one symbol to the next is fixed at $T_s$, the change in phase angle with respect to time (dθ/dt) is dependent upon the difference of phase angles from one symbol to the next transmitted symbol since:

$$f = \frac{d\theta}{dt} \quad (1)$$

The change in phase angle θ with respect to time t determines the frequency requirements and power envelope variations of a transmitted signal. If large phase angle changes, such as transition 92, are allowed, the power variation is very large. The power is indicated by the distance from the center of the constellation to any point on a transition path. For transition 92, the minimum transmitted power is indicated as $P_{92min}$, with the maximum and average transmitted power being $P_{92max}$ and $P_{92ave}$, respectively. For a smaller transition 84, the maximum transmitted power is the same, but the minimum and average transmitted power, $P_{84min}$, $P_{84ave}$, respectively, are much closer to the maximum transmitted power $P_{84max}$.

By eliminating large phase angle transitions, such as transitions 82 and 92, and only allowing small transitions such as 84, 86 and 88, the power variation of the transmitter and the frequency spectrum of the transmitter may be narrowed. A signal constellation must be used which has a number of extra symbols over the number of symbols intended to be transmitted. This allows encoding of a number of symbols, while avoiding phase angle transitions which would result in a larger envelope power variations.

Figure 3:
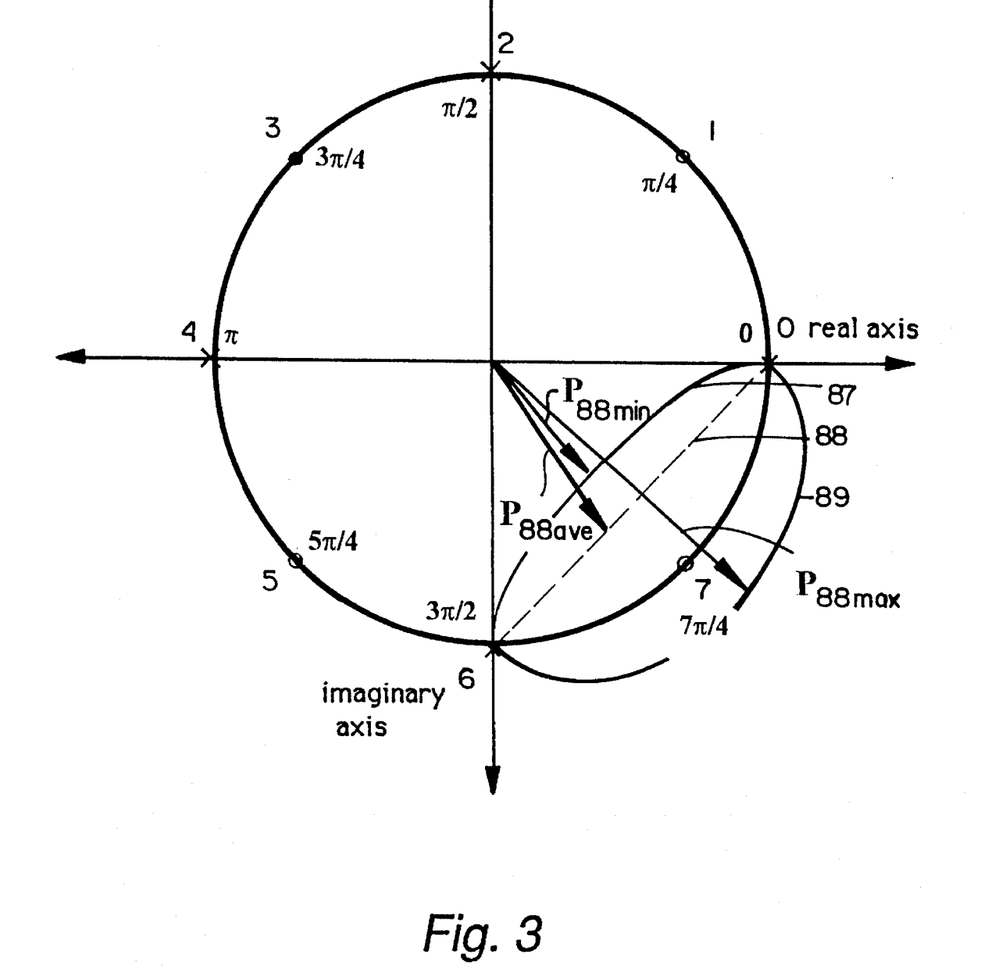
FIG. 3 is an illustration of the eight symbol signal constellation of FIG. 2 with actual symbol transitions superimposed upon it.

FIG. 3 illustrates a phase transition from symbol 6 to symbol 0 and vice versa. Theoretically, the transition from symbol 6 to symbol 0 should follow the dashed line 88. In real systems, however, a transition from symbol 6 to symbol 0 follows either a path 87 or a path 89. Paths 89 and 87 differ from path 88 due to the characteristics of the transmit filter 98 and mapper 96 of FIG. 5. The maximum power required for transition 89 is shown by arrow $P_{88max}$, the minimum power required is indicated by an arrow $P_{88min}$ and the average is $P_{88ave}$.

It is desirable for the transmitted signal to have a small maximum/average transmitted power variation. This relaxes the linearization requirements on the power amplifier. Further, for a given maximum transmitted power rating, a higher average power increases range. This is because the bit error rate (BER) decreases with increasing average transmitted power.

Usually, raising the maximum transmitted power causes the average transmitted power and the minimum transmitted power to increase. As the power is increased, the life of the batteries of mobile units decreases. Therefore, it is desirable to increase the minimum transmitted power, and reduce the maximum transmitted power while maintaining an average transmitted power which will allow communications at a desired range.

Since a large variation in phase angle between adjacent symbols equates also to a large transmitted power variation, it would be beneficial to limit the phase angle transitions so as to limit the transmitted power variations, known as envelope variations.

The present invention transmits digital information in differential phase angles. A maximum differential phase angle Θ is chosen. The value of Θ determines the amount of allowable envelope variation. Lower values of Θ simply lower envelope variation. The transmitted sequence s(n) is defined by:

$$s(n+1) = s(n)e^{j\phi(n)}$$

where n is the index of a time period in which the symbol is transmitted, φ(n) is a differential symbol phase angle. The differential φ(n) is −Θ when the input is all zeros, +Θ when the input is all ones, and takes one of $2^l$ equally spaced phase angle values between −Θ and Θ for the other values of the input where l is the number of input bits. For example, for l=2:

$$\phi(n) = \begin{cases} -\Theta, & \text{if the input is 00} \\ -\Theta/3, & \text{if the input is 01} \\ \Theta/3, & \text{if the input is 10} \\ \Theta, & \text{if the input is 11} \end{cases} \quad (3)$$

A case of practical interest for l=2 is when Θ is equal to π/2, which results in:

$$\phi(n) = \begin{cases} -\pi/2, & \text{if the input is 00} \\ -\pi/6, & \text{if the input is 01} \\ \pi/6, & \text{if the input is 10} \\ \pi/2, & \text{if the input is 11} \end{cases} \quad (4)$$

Another special case is when Θ is equal to 3π/4 in which case the transmission scheme is the same as π/4-shifted DQPSK.

Figure 4A:
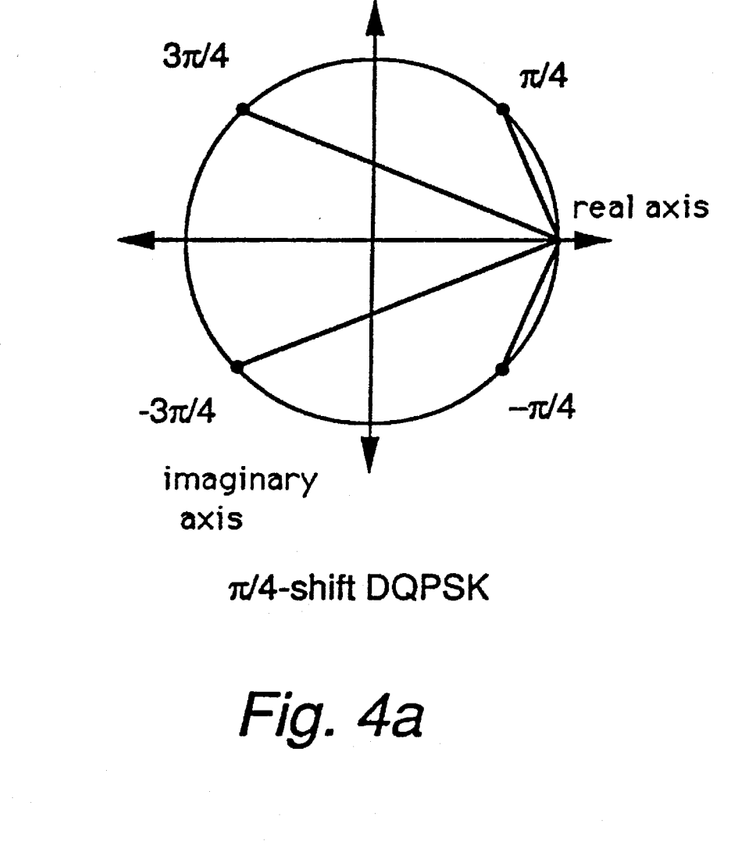
FIG. 4a and 4b illustrate signal constellation points for π4-shifted differential quadrature phase shift keying (DQPSK) and the present invention with a maximum phase angle constrained to be π/2, respectively.
Figure 4B:
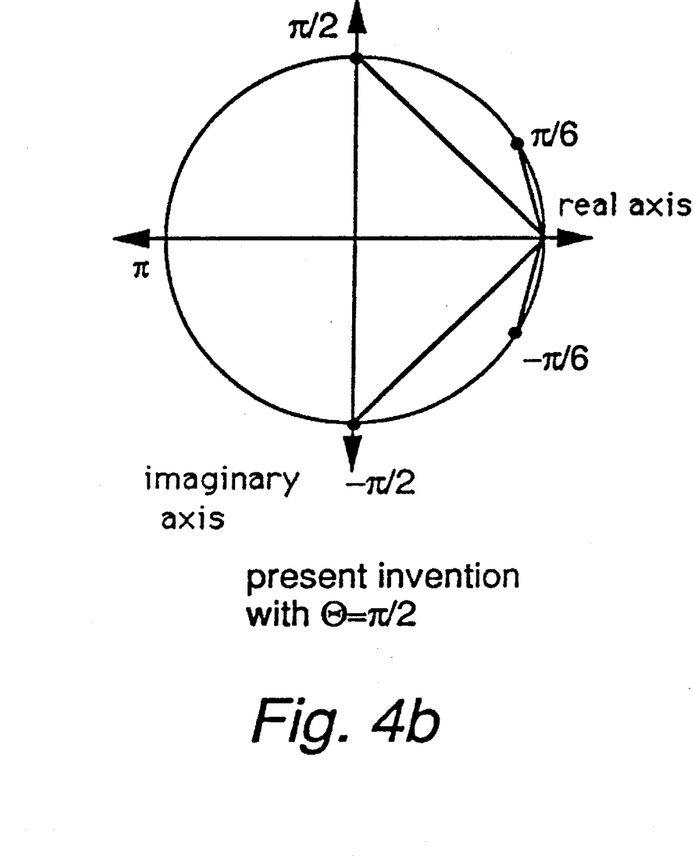

FIG. 4a illustrates the constellation points for π/4-shifted DQPSK and FIG. 4b illustrates those of the present invention with the maximum phase angle Θ being π/2. The constellation points of the present invention are measured relative to the previously transmitted phase angle and constantly rotate such that they are always within the maximum phase angle Θ of the last transmitted phase angle. The optimum situation results by choosing a maximum phase angle to be defined by:

$$\Theta = \frac{(2^l - 1)\pi}{k}$$

where k is an integer resulting in a total of 2k possible transmitted phase angles. An arbitrary choice of Θ may lead to excessive possibilities of transmitted phase angles, causing problems with equalization and coherent detection.

Another important parameter in the choice of a modulation scheme is the minimum Euclidean distance between transmitted sequences. This separation between transmitted sequences determines the amount of immunity the scheme has to interference, since the interference has to be considerable in relation to this separation in order to lead to a wrong decision. Thus, a higher minimum distance is preferred.

However, in this case, the lower envelope variation is obtained at the cost of a lower minimum distance between transmitted sequences. For example, this parameter is equal to 2 for π/4-shifted DQPSK and is equal to 1 for the modulation scheme of the present invention with l=2 and Θ equal to π/2. Thus, these modulation schemes provide a way to trade distance for envelope variation.

In the case of the maximum phase angle Θ being 3π/5, the envelope variation is larger than Θ=/2, but the distance between points is increased.

Figure 5:
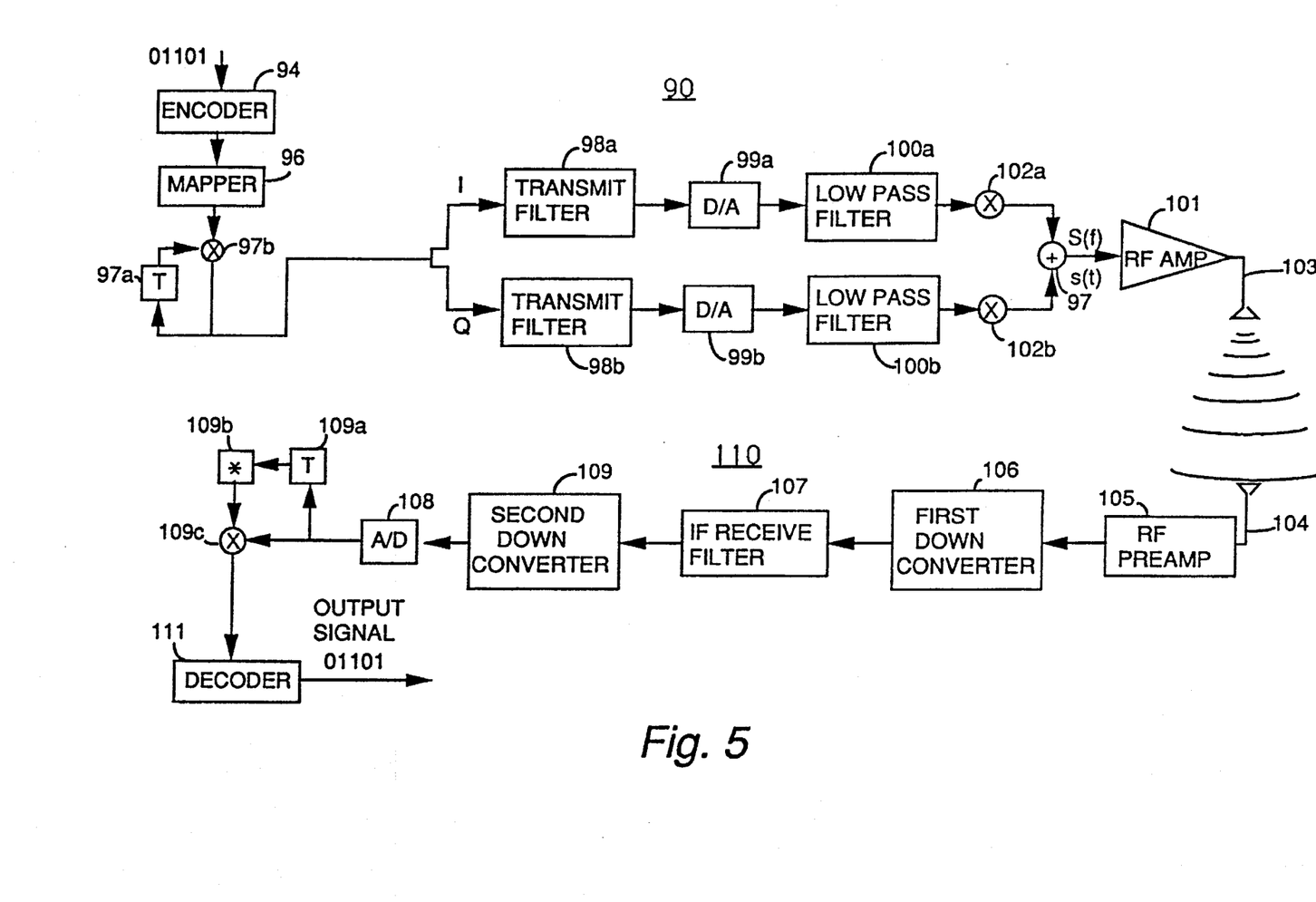
FIG. 5 is a simplified block diagram of a communication system employing the present invention.

A simplified block diagram of a communication system embodying the invention is shown in FIG. 5. Digital information desired to be transmitted is introduced into an encoder 94 of a transmitter 90. The digital information may be from a digital source or an analog signal which has been digitized (in the case of digitized speech). Encoder 94 transforms the digital information to an encoded signal which is passed to a mapper 96. (A delay circuit 97a and a multiplier 97b may be employed to create a difference between the present symbol and the subsequent symbol in the case of differential phase encoding.) Mapper 96 maps the encoded signal onto a symbol of a signal constellation, such as a symbol as shown in FIG. 2 constrained according to Eq. 2 or 3. This signal may be represented by its in-phase (I) and quadrature (Q) components which are passed through parallel processing branches. Each of these signals is passed through transmit filters 98a, 98b, D/A converters 99a, 99b, and low pass filters 100a, 100b, and is frequency shined by quadrature modulators 102a, 102b and finally mixed by a summer 97. The signal from summer 97 is then sent to an RF amplifier 101 which increases the gain of the signal. The RF amplifier passes the amplified signal to an antenna 103 which transmits to a second antenna 104 at a remote receiver 110. The received signal is passed through an RF preamplifier 105 to a first down converter 106 which reduces the frequency of the received signal in the MHz. range to an intermediate frequency signal in the kHz. range. The intermediate frequency signal is passed to an intermediate frequency receive filter 107, then through a second down converter 109 to produce a filtered baseband signal. The filtered baseband signal is digitized by an analog-to-digital converter 108, then differentially demodulated employing a delay element 109a and phase inverter 109b and multiplier 109c. It is then passed to a decoder 111 which processes the digitized baseband signal to recover the transmitted signal information according to the constraints of Eqs. 2 or 3.

Figure 6:
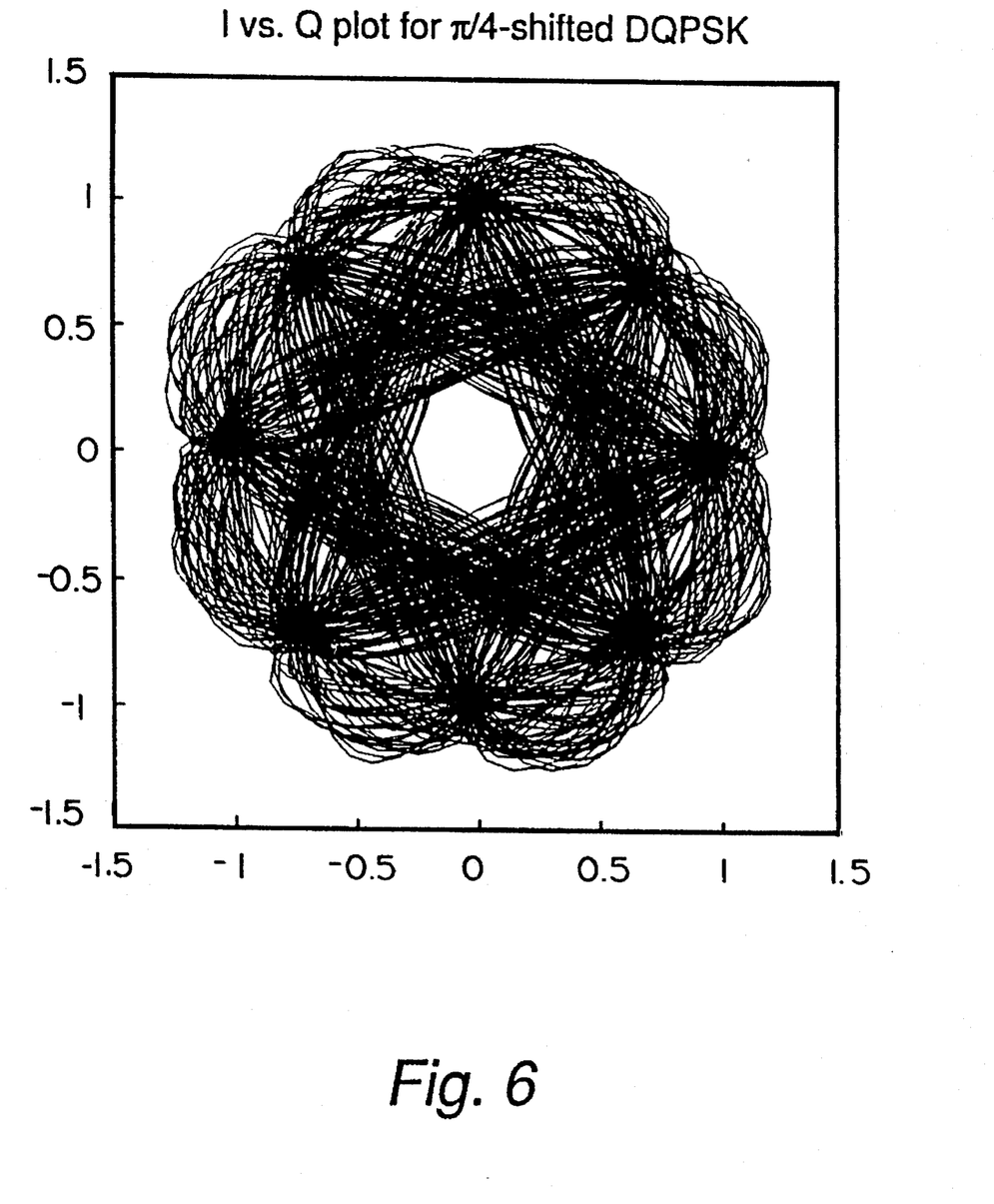
FIGS. 6 is a graph of the power envelope variations for π/4-shifted DQPSK.
Figure 7:
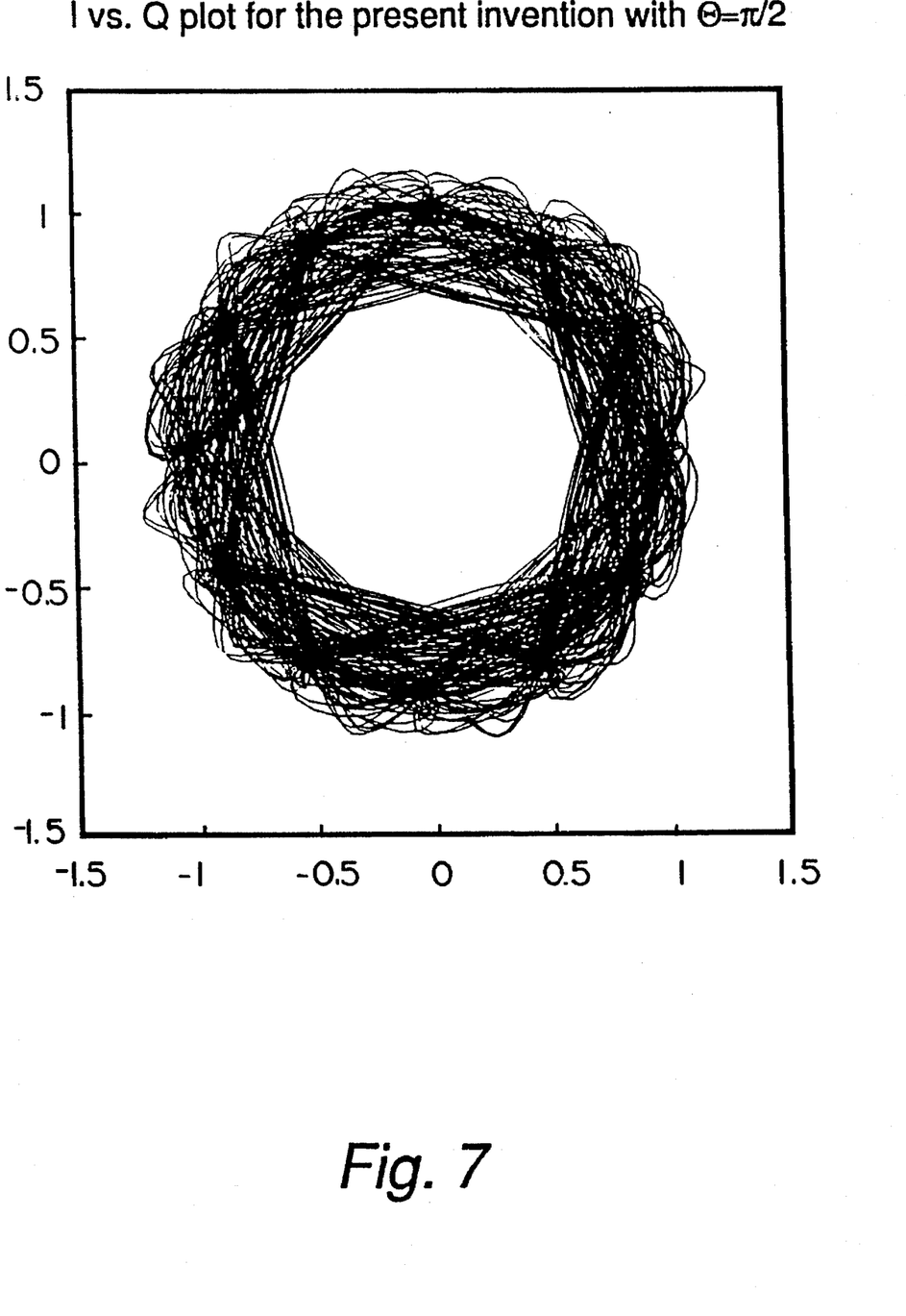
FIG. 7 is a graph of power envelope variations for a modulation scheme compatible with the present invention.

As mentioned above, the RF power amplifier in the transmitter has a nonlinear response, and, in order to keep spectral splatter into other channels low, it is desirable to have low envelope variations in the transmitted signal. The modulation scheme of the present invention was chosen to achieve low envelope variations in the transmitted signal. The envelope variations for π/4-shifted DQPSK and those obtained using the proposed modulation scheme are shown in FIGS. 6 and 7, respectively. The envelope variations are plotted in terms of an I-Q plot which illustrates the amplitude of the I signal versus the amplitude of the Q signal (both of which vary with time). It should be noted that the I and Q signals shown in FIGS. 6 and 7 correspond to the I and Q signals after low-pass filtering as shown in FIG. 5. The vector sum of the I and the Q components gives the value of the envelope at any time. Thus, the distance of a point on the I-Q plot from the origin gives the value of the envelope. The I-Q plot, therefore, displays the range of envelope variations of the transmitted signal. From the I-Q plots shown it is clear that the proposed modulation scheme exhibits considerably lower envelope variations than π/4-shifted DQPSK.

Another parameter that is of interest in a Land Mobile Radio Channel is the Adjacent Channel Interference Protection Ratio (ACIPR). A definition of ACIPR, and background on the improvement of the ACIPR through proper spectral shaping of the transmitted signal, is described in U.S. Patent Application "Improved Trellis Coding Technique to Increase Adjacent Channel Interference Protection Ratio in Land Mobile Radio Under Peak Power Constraints", by S. Chennakeshu, et al, Ser. No. 07/975,201 filed 6/15/92, assigned to the present assignee and hereby incorporated by reference. The proposed modulation scheme achieves low envelope variations by restricting the maximum phase changes. Thus, the modulation scheme of the present invention has the ability to shape the spectrum of the transmitted signal and can hence, provide gains in ACIPR. In addition, the distortion produced by the RF amplifier is decreased due to lower envelope variations of the transmitted signal. The lower distortion translates to lower ACI, implying higher ACIPR.

Figure 8:
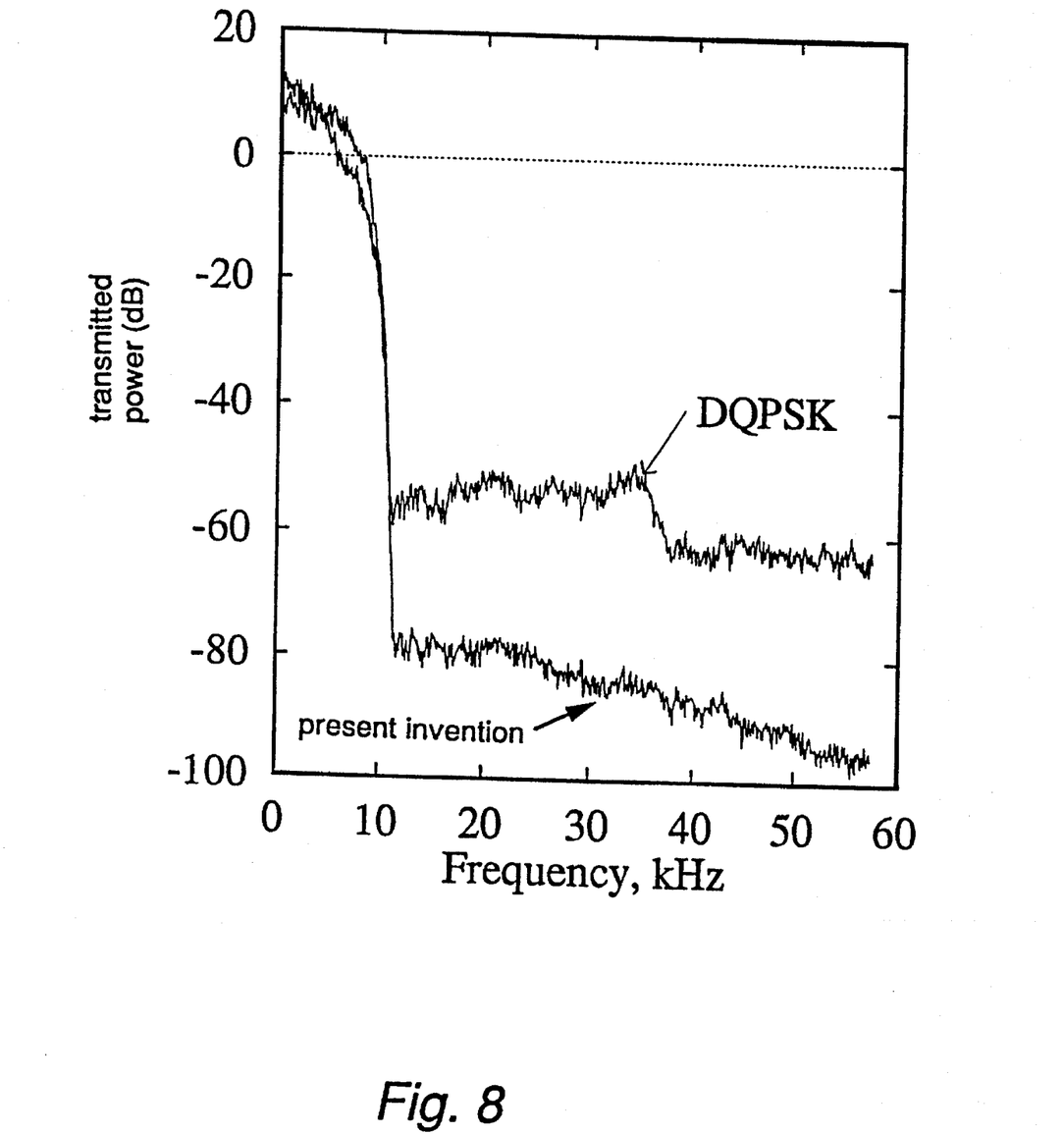
FIG. 8 is a graph of transmitted power vs. frequency for a simulation of the modulation schemes of π/4-shifted DQPSK and the present invention employing a maximum phase angle of π/2.

A simulation was performed employing an embodiment of the present invention. FIG. 8 is a plot of the transmitted signal power vs. frequency for the prior art π4-shifted DQPSK modulation scheme, and the modulation scheme of the present invention with Θ=/2 and employing a model of a non-linear RF amplifier. The sidelobes are 20 dB lower for the present invention as compared with π/4-shifted DQPSK.

Although described for LMR channels, the invention described herein is equally applicable to other spectrally congested channels.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of communicating digital information over a radio channel comprising steps of:
   a) mapping l bits of digital information directly to a differential phase angle of a signal constellation with equally spaced phase angles where a maximum modulus of a differential phase angle $\Theta$ is given by:

$$\theta = \frac{(2^l - 1)\pi}{k}$$

where k is an integer greater than or equal to $2^l$ and where k and l may assume values in addition to and different from an instance where k=4 and l=2;
   b) accumulating differential phase angles generated in step (a);
   c) forming an analog signal from the differential phase angles accumulated in step (b);
   d) transmitting the analog signal;
   e) receiving the signal transmitted in step (d) at an antenna of a receiver; and
   f) demodulating the signal received in step (e) into digital information according to phase angles in the signal constellation.

2. The method of communicating digital information over a radio channel of claim 1 wherein l=2 and the maximum phase angle $\theta$ is less than or equal to $3\pi/k$, where k is an integer greater than 4.

3. The method of claim 1, wherein by limiting the differential phase angle $\theta$ to the maximum modulus of the differential phase angle $\theta$ or less, variation in an envelope of the transmitted analog signal is minimized.

4. A method of transmitting digital information over a radio channel comprising steps of:
   encoding digital information directly into differential phase angles selected from a signal constellation where the differential phase angles are constrained by a predetermined maximum phase angle;
   converting the differential phase angles into an analog signal; and
   transmitting the analog signal as a transmitted analog signal, wherein the predetermined maximum phase angle is selected to limit envelope variations in the transmitted analog signal;
   wherein the predetermined maximum phase angle is specified by:

$$\theta = \frac{(2^l - 1)\pi}{k}$$

where $\theta$ represents the predetermined maximum phase angle, k is an integer greater than or equal to $2^l$, l is a number of bits encoded for each symbol, and where k and l may assume values in addition to and different from an instance where k=4 and l=2.

5. The method according to claim 4, further comprising:
   selecting the predetermined maximum phase angle to limit differences between peak transmitted power and average transmitted power of the transmitted analog signal.

6. A transmitter for transmitting digital information in a radio signal exhibiting reduced adjacent channel interference by limiting power envelope variations of a transmitted radio signal comprising:
   a) a mapper for mapping l bits of digital information directly to a differential phase angle $\theta$ of a signal constellation with equally spaced phase angles and where a maximum modulus of the differential phase angle $\theta$ is given by:

$$\theta = \frac{(2^l - 1)\pi}{k}$$

where k is an integer greater than or equal to $2^l$ and where k and l may assume values in addition to and different from an instance where k=4 and l=2;
   b) a front end including a transmit filter, an analog-to-digital (A/D) converter, and a low pass filter for converting accumulated differential phase angles into an analog signal wherein by limiting differential phase angles to the maximum modulus or less, power required to transmit the analog signal is reduced; and
   c) an RF amplifier for amplifying and transmitting the analog signal.

7. The transmitter according to claim 6, wherein an output signal of the RF amplifier has an output-to-input signal characteristic that is substantially linear for a range of limited power envelope variations of the output signal.

8. The transmitter according to claim 6, wherein a variation between a maximum power of the transmitted analog signal and an average power of the transmitted analog signal is minimized.

* * * * *